(12) United States Patent
Takata

(10) Patent No.: US 11,127,957 B2
(45) Date of Patent: Sep. 21, 2021

(54) FUEL CELL SEPARATOR

(71) Applicant: TOYOTA JIDOSHA KABUSHIKI KAISHA, Toyota (JP)

(72) Inventor: Satoshi Takata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 16/364,286

(22) Filed: Mar. 26, 2019

(65) Prior Publication Data

US 2019/0326611 A1 Oct. 24, 2019

(30) Foreign Application Priority Data

Apr. 23, 2018 (JP) .............................. JP2018-082269

(51) Int. Cl.
| | |
|---|---|
| *H01M 8/0228* | (2016.01) |
| *B05D 5/12* | (2006.01) |
| *H01M 8/0206* | (2016.01) |
| *H01M 8/0221* | (2016.01) |
| *B05D 7/24* | (2006.01) |
| *H01M 8/10* | (2016.01) |
| *C23C 4/08* | (2016.01) |

(52) U.S. Cl.
CPC ............ *H01M 8/0228* (2013.01); *B05D 5/12* (2013.01); *B05D 7/24* (2013.01); *C23C 4/08* (2013.01); *H01M 8/0206* (2013.01); *H01M 8/0221* (2013.01); *H01M 8/10* (2013.01)

(58) Field of Classification Search
None
See application file for complete search history.

(56) References Cited

U.S. PATENT DOCUMENTS

| | | | | |
|---|---|---|---|---|
| 2007/0298309 | A1* | 12/2007 | Vyas ................... | H01M 8/0204 429/457 |
| 2010/0285371 | A1* | 11/2010 | Lee ..................... | H01M 50/431 429/247 |
| 2020/0335801 | A1* | 10/2020 | Li ........................ | H01M 8/0226 |

FOREIGN PATENT DOCUMENTS

| | | | |
|---|---|---|---|
| CN | 102593479 A | * | 7/2012 |
| JP | 08-185870 A | | 7/1996 |
| JP | H08185870 A | * | 7/1996 |
| JP | 2006-172720 A | | 6/2006 |
| JP | 2008-266744 A | | 11/2008 |
| JP | 2008266744 A | * | 11/2008 |
| JP | 2017-112051 A | | 6/2017 |
| JP | 2017112051 A | * | 6/2017 |

(Continued)

OTHER PUBLICATIONS

Winther-Jensen, Bjorn et al. "Conducting Polymer Composite Materials for Hydrogen Generation." Advanced Materials, vol. 22, No. 15, Apr. 18, 2010, pp. 1727-1730 (Year: 2010).*

(Continued)

*Primary Examiner* — Ula C Ruddock
*Assistant Examiner* — Amanda Rosenbaum
(74) *Attorney, Agent, or Firm* — Sughrue Mion, PLLC

(57) ABSTRACT

A fuel cell separator having high electrical conductivity is provided. A fuel cell separator including, on a substrate, an antimony-doped tin oxide film, in which the antimony-doped tin oxide film contains a poly(3,4-ethylenedioxythiophene)/polyethylene glycol (PEDOT/PEG) copolymer in a content of 15% by volume or more but 25% by volume or less is provided.

2 Claims, 3 Drawing Sheets

(56) References Cited

FOREIGN PATENT DOCUMENTS

JP          2017-199535 A      11/2017
WO     WO-2011006216 A1 *   1/2011    ............ H01M 8/023

OTHER PUBLICATIONS

Sara Cavaliere et al. "Highly Stable PEMFC Electrodes Based on Electrospun Antimony-Doped SnO 2" ChemElectroChem, Weinheim: Wiley-VCH, 2015, 2 (12), pp. 1966-1973 (Year: 2015).*
English translation of Zhou (CN-102593479-A) (Year: 2012).*

* cited by examiner

FUEL CELL SEPARATOR

CROSS REFERENCE TO RELATED APPLICATIONS

This application is based upon and claims the benefit of priority from Japanese patent application No. 2018-082269, filed on Apr. 23, 2018, the disclosure of which is incorporated herein in its entirety by reference.

BACKGROUND

The present disclosure relates to a fuel cell separator.

A separator used for a fuel cell that has a concavo-convex shape formed by press working or the like has been known. This separator is arranged on a gas diffusion layer of a membrane electrode assembly, which forms a unit cell. A surface of this separator on the side of the gas diffusion layer forms a gas surface that forms a flow path of reactive gas or the like and another surface thereof forms a cooling surface that forms a flow path of cooling water or the like. Further, this separator typically has electrical conductivity in order to draw electric power obtained from the unit cell.

Further, it is required that the separator have corrosion resistance against hydrofluoric acid-based acid generated in the membrane electrode assembly.

Japanese Unexamined Patent Application Publication No. 2017-199535 discloses a separator for a fuel cell including a substrate having a concavo-convex shape and a CVD coating film made of a conductive oxide formed in a concavo-convex part of this substrate as a separator for a fuel cell having high electrical conductivity and corrosion resistance. In Examples disclosed in Japanese Unexamined Patent Application Publication No. 2017-199535, a coating film made of tin oxide is used as the CVD coating film. Further, in the Examples disclosed in Japanese Unexamined Patent Application Publication No. 2017-199535, the target of evaluation of electrical conductivity is electrical conductivity between the separator and a carbon sheet, which is a gas diffusion layer.

Japanese Unexamined Patent Application Publication No. H08-185870 discloses a separator for a solid electrolytic fuel cell composed of a base substrate made of a specific cermet and a protective film made of a specific metal oxide as a separator for a fuel cell having good electrical conductivity and high corrosion resistance, and exemplifies an antimony-doped tin oxide as a metal oxide.

Japanese Unexamined Patent Application Publication No. 2017-112051 discloses, as a transparent electrode used for a liquid crystal, an organic EL or the like, a transparent electrode including an insulating substrate, a thin film made of a conductive metal oxide, and a thin film including a specific polythiophene in this order. According to Japanese Unexamined Patent Application Publication No. 2017-112051, applying a thin film including a specific polythiophene on the metal oxide layer in order to improve surface smoothness has been discussed. Japanese Unexamined Patent Application Publication No. 2017-112051 discloses the specific polythiophene in which a sulfo group is introduced into thiophene by polystyrene sulfonic acid or the like.

SUMMARY

The fuel cell is used as a stack in which the unit cells are stacked in order to obtain a necessary voltage. In this case, the separators included in the respective unit cells contact each other, and electrical conductivity between the separators is required.

In the case of the separator including the coating film made of a conductive oxide, the carbon sheet is flexibly deformed when it is pressed, and it comes in close contact with the separator between the separator and the flexible carbon sheet, and thus electrical conductivity tends to be high. On the other hand, since it is difficult to deform the separator even by pressing it, it has been difficult to improve electrical conductivity between separators.

The present disclosure has been made in view of the aforementioned circumstances and provides a fuel cell separator having high electrical conductivity.

A fuel cell separator according to this embodiment includes, on a substrate, an antimony-doped tin oxide film, in which the antimony-doped tin oxide film contains a poly(3,4-ethylenedioxythiophene)/polyethylene glycol (PEDOT/PEG) copolymer in a content of 15% by volume or more but 25% by volume or less.

A fuel cell separator according to this embodiment includes, on a substrate, an antimony-doped tin oxide film, in which the antimony-doped tin oxide film contains a poly(3,4-ethylenedioxythiophene)/polyethylene glycol (PEDOT/PEG) copolymer, and an element ratio of a total of sulfur and carbon to tin [(S+C)/Sn] in the antimony-doped tin oxide film is 0.6 or more but 1.1 or less.

According to the present disclosure, it is possible to provide a fuel cell separator having high electrical conductivity between separators.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
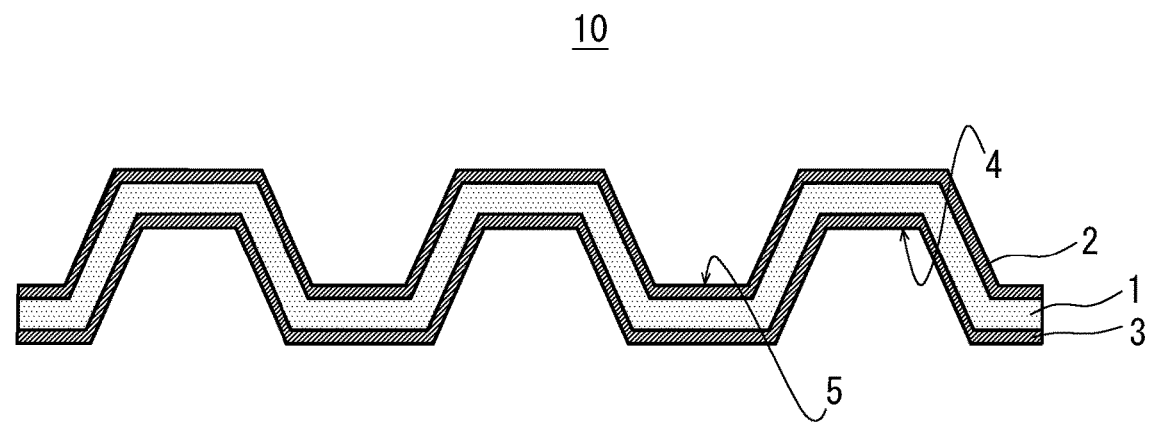
FIG. 1 is a schematic cross-sectional view showing one example of a fuel cell separator according to this embodiment.

Referring to FIG. 1, an outline of a fuel cell separator according to this embodiment will be explained. A fuel cell separator 10 as shown in the example of FIG. 1 includes antimony-doped tin oxide (ATO) films (2 and 3) on a substrate 1.

Figure 2:
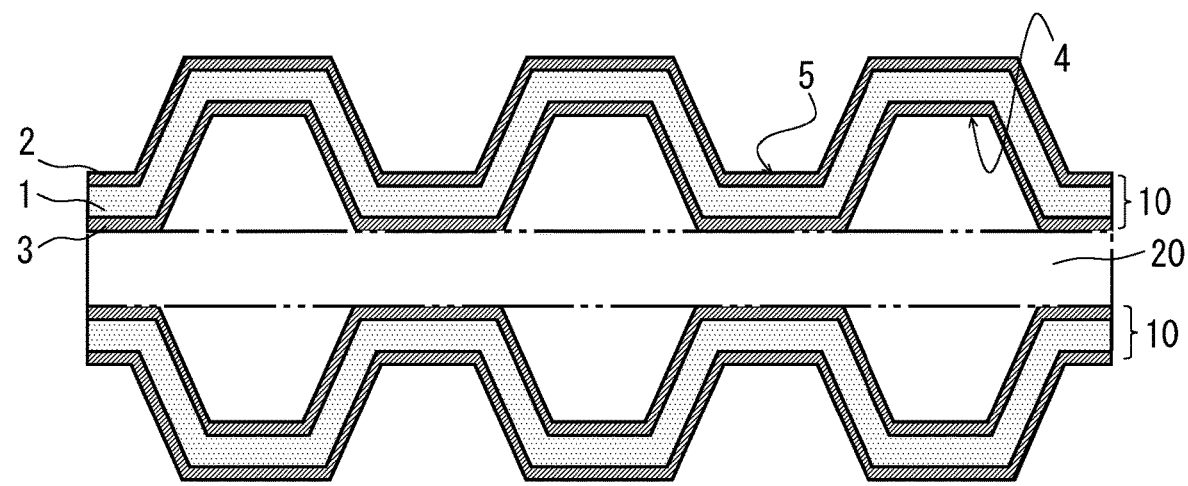
FIG. 2 is a schematic cross-sectional view showing one example of a usage state of the fuel cell separator according to this embodiment.

The fuel cell separator 10 according to this embodiment includes, as shown in the example of FIG. 2, gas surfaces 4 disposed in a gas diffusion layer included in a membrane electrode assembly 20 in such a way that the gas surfaces 4 are opposed to each other, which forms a gas flow path, and has electrical conductivity to draw electric power obtained from the membrane electrode assembly 20.

Figure 3:
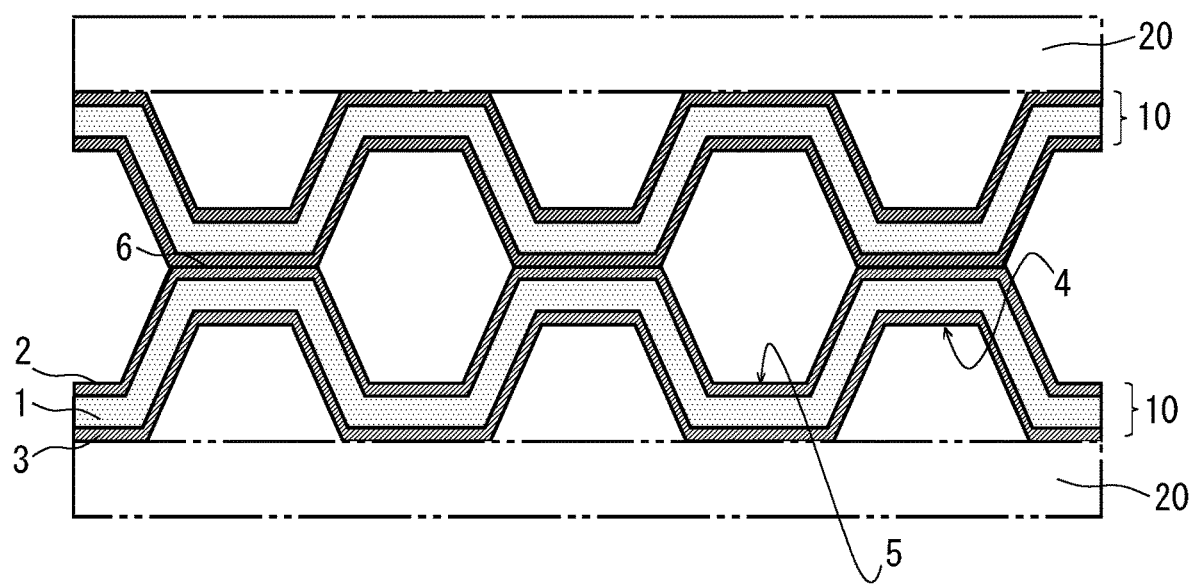
FIG. 3 is a schematic cross-sectional view showing one example of a contact of fuel cell separators.

The fuel cell typically has a stack structure in which the membrane electrode assemblies 20 are stacked on one another in order to obtain a necessary voltage. When the membrane electrode assemblies 20 are stacked on one another as shown in the example of FIG. 3, at least some of cooling surfaces 5 come in contact with each other in the fuel cell separator 10, whereby a contact part 6 is formed.

In the fuel cell separator according to this embodiment, the ATO film contains a poly(3,4-ethylenedioxythiophene)/polyethylene glycol (PEDOT/PEG) copolymer in a content of 15% by volume or more but 25% by volume or less, whereby the elastic force of an antimony-doped tin oxide film is reduced, electrical conductivity in the contact part 6 of the separators is improved, and corrosion resistance of the substrate 1 is improved.

In the following description, each of the components of the fuel cell separator according to this embodiment will be explained in detail.

The material of the substrate 1 that composes the separator is not particularly limited, and can be selected as appropriate from among known materials used for a fuel cell separator. Examples thereof are a plastic material, a metallic substrate or the like. A metallic substrate is preferably used from the viewpoint of high corrosion resistance, high electrical conductivity and the like. The metal used for the metallic substrate may be, for example, iron, titanium, aluminum or an alloy such as stainless, but is not limited thereto. The metal is preferably titanium or stainless in view of corrosion resistance and is preferably stainless from the viewpoint of easy availability or the like.

The shape of the substrate may be a desired shape in accordance with the design of the fuel cell. The shape of the separator may be, for example, the one that includes a gas surface 4 where a gas flow path can be formed on the side of the membrane electrode assembly 20 and a cooling surface 5 where a flow path of a refrigerant or the like can be formed on the surface on the opposite side of the gas surface 4.

The thickness of the substrate may be selected as appropriate to the extent that gas blocking property and electrical conductivity are secured, and may be, for example, 0.05 mm-0.2 mm, and preferably 0.1 mm.

The ATO film that composes the separator according to this embodiment includes an antimony-doped tin oxide and a PEDOT/PEG copolymer, and the PEDOT/PEG copolymer is contained in a content of 15% by volume or more but 25% by volume or less relative to the whole film.

By containing the PEDOT/PEG copolymer having electrical conductivity in the ATO film in the aforementioned certain ratio, it is possible to give flexibility to the ATO film and to improve the electrical conductivity in the contact part 6 between the separators. Further, since the PEDOT/PEG copolymer does not include a polar group such as a sulfo group, it is possible to prevent hydrofluoric acid-based acid generated in the membrane electrode assembly 20 or hydrochloric acid-based acid generated in the gas flow path or the like from eroding the substrate, and to improve corrosion resistance of the separator.

As shown in Examples that will be explained later, when the PEDOT/PEG copolymer is contained in a content of 15% by volume or more but 25% by volume or less relative to the whole film in the ATO film, the element ratio of a total of sulfur and carbon to tin [(S+C)/Sn] in the ATO film becomes 0.6 or more but 1.1 or less.

The ATO film may be formed on both surfaces of the substrate, as shown in FIG. 1, may be formed only on the side of the gas surface 4 of the substrate, or may be formed only in the contact part 6 where the separators contact each other. The ATO film is preferably formed on both surfaces of the substrate in view of easiness of manufacturing, electrical conductivity, and corrosion resistance of the substrate.

The PEDOT/PEG copolymer is preferably a block copolymer including a poly(3,4-ethylenedioxythiophene) block and a polyethylene glycol block. Since the PEDOT/PEG copolymer includes a poly(3,4-ethylenedioxythiophene) block, electrical conductivity is given to copolymer. The block copolymer may be, for example, a linear tri-block having a polyethylene glycol block on both ends of the a poly(3,4-ethylenedioxythiophene) block or a linear multi-block in which a poly(3,4-ethylenedioxythiophene) block and a polyethylene glycol block are alternately repeated.

The PEDOT/PEG copolymer may be synthesized, for example, by a method of polymerizing 3,4-ethylenedioxythiophene and forming the poly(3,4-ethylenedioxythiophene) block, and then introducing polyethylene glycol thereinto, thereby forming the polyethylene glycol block at the end, or a commercial product may be used. The commercial product may be, for example, the one whose product name is Aedotron C3-NM, the one whose product name is Aedotron C-NM or the like manufactured by Aldrich.

The antimony-doped tin oxide is not particularly limited, and a particle-shaped one having a particle diameter of 1 nm-500 nm may be, for example, selected as appropriate.

While the method of forming the ATO film on the substrate is not particularly limited in this embodiment, the ATO film can be formed by, for example, preparing a coating liquid in which an antimony-doped tin oxide and a PEDOT/PEG copolymer are contained in a solvent in a desired ratio, applying this coating liquid onto the substrate, and heating and drying this substrate as necessary.

The coating method is not particularly limited and may be, for example, selected from among coating means such as a spray coating method, a dip coating method, a bar coating method, a roll coating method, and a spin coating method.

While the thickness of the ATO film is not particularly limited, it is preferably about 0.1 mm from the viewpoint of electrical conductivity and corrosion resistance.

EXAMPLES

While this embodiment will be explained hereinafter in detail with reference to Examples and comparative examples, this embodiment is not limited to the following Examples.

Example 1

A stainless (SUS447) plate (thickness: 0.1 mm) was prepared as a substrate and an antimony-doped tin oxide (particle diameter: 10 nm, product name: T-1 manufactured by Mitsubishi Materials Corporation) and a PEDOT/PEG copolymer nitromethane solution (product name: Aedotron C3-NM manufactured by Aldrich) were prepared as materials for an antimony-doped tin oxide film.

The aforementioned substrate was placed in a vacuum chamber, argon gas was introduced therein under a vacuum condition, a voltage was applied to generate argon ions, and the substrate surface was hit, whereby the oxide film on the surface was removed.

Separately from the aforementioned process, a mixed solution in which an antimony-doped tin oxide powder was mixed into a PEDOT/PEG copolymer nitromethane solution was prepared as a coating liquid. The mixing amount of the antimony-doped tin oxide powder was adjusted in such a way that the volume of PEDOT/PEG copolymer after the coating film formation became 15% by volume relative to the whole film.

Next, the coating liquid was applied onto a substrate from which the oxide film was removed by a spin coating method (1000 rpm). Next, this substrate was heated to 100° C., and nitromethane was applied, whereby a substrate having an ATO film was formed.

Examples 2-3 and Comparative Examples 1-3

A substrate having an ATO film was formed in a way similar to that in the Example 1 except that the coating liquid was prepared in such a way that the volume of the PEDOT/PEG copolymer became 5, 10, 20, 25, and 30% by volume relative to the whole film by changing the mixing amount of the antimony-doped tin oxide powder in the preparation of the coating liquid according to the Example 1.

Comparative Example 4

A substrate having an ATO film was formed in a way similar to that in the Example 1 except that nitromethane solvent was used in place of the PEDOT/PEG copolymer nitromethane solution and a coating liquid in which the volume of PEDOT/PEG copolymer was 0% by volume relative to the whole film was prepared in the preparation of the coating liquid according to the Example 1.

<Measurement of Contact Resistance>

Figure 4:
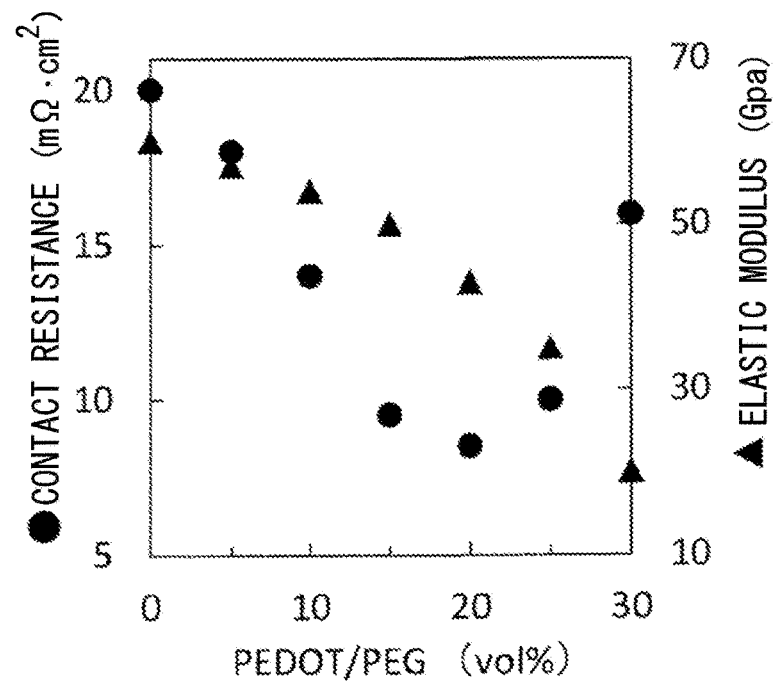
FIG. 4 is a graph showing a relation between a content rate of (PEDOT/PEG) copolymer in an antimony-doped tin oxide film that composes the separator, and contact resistance and an elastic modulus.

Two substrates, each having the ATO film according to the Example 1, were prepared, the surfaces of the substrates where the ATO films were formed were overlapped each other, and a voltage value when a constant current was applied between the substrates while applying pressure of 0.98 MPa per unit area was measured, whereby a resistance value was calculated. A measurement similar to that stated above was performed also in the Examples 2-3 and the comparative examples 1-4, whereby resistance values were calculated. FIG. 4 shows the results.

<Measurement of Elastic Modulus of Film>

Regarding each of the ATO films formed in the Examples 1-3 and the comparative examples 1-4, the elastic modulus at the depth of 10-15 nm of the indenter was measured by a nanoindentation method (continuous stiffness measurement method) using an ultramicro-hardness tester (Nano Indenter DCM manufactured by MTS Systems Corporation). A trigonal pyramid diamond indenter was used as the indenter. FIG. 4 shows the results.

<Measurement of Element Ratio of Film>

Figure 5:
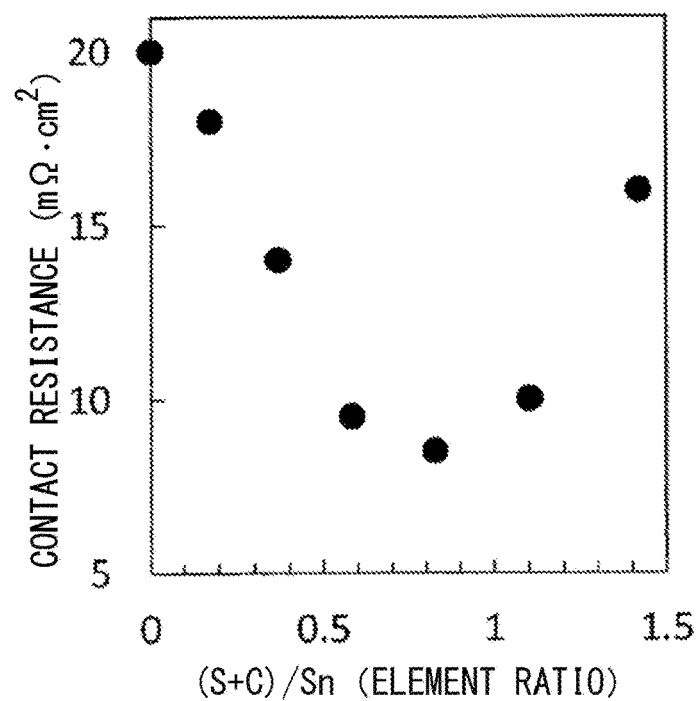
FIG. 5 is a graph showing a relation between an element ratio [(S+C)/Sn] of a total of sulfur and carbon to tin in the antimony-doped tin oxide film that composes the separator, and contact resistance.

The ATO films according to the Examples 1-3 and the comparative examples 1-4 were measured by X-ray photoelectron spectroscopy (XPS) and thus the element ratio (S+C)/Sn was calculated. FIG. 5 shows a relation between the element ratio and the contact resistance.

[Summary of Results]

As shown in FIG. 4, when the content rate of PEDOT/PEG copolymer in the ATO film became high, the elastic modulus of the film tended to decrease. When the elastic modulus of the film decreased, the contact resistance tended to decrease. However, when the content rate of PEDOT/PEG copolymer was too large, the contact resistance tended to increase. It can be estimated that this is because the conductive network in a film made of tin oxide particles having high electrical conductivity was broken since the ratio of PEDOT/PEG copolymer increased. It has been revealed, from the aforementioned experimental results, that an antimony-doped tin oxide contains a (PEDOT/PEG) copolymer in a content of 15% by volume or more but 25% by volume or less, whereby the elastic modulus of the film is reduced and the adhesion between separators is improved, and the conductive network of the tin oxide particles is maintained, and thus the separator according to this embodiment having high electrical conductivity between separators is obtained.

Further, as shown in FIG. 5, it has been revealed that, when PEDOT/PEG copolymer is included in the ATO film, the range in which the element ratio (S+C)/Sn is 0.6-1.1 is preferable in view of high electrical conductivity between separators.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell separator comprising, on a substrate, an antimony-doped tin oxide film,
wherein the antimony-doped tin oxide film contains a poly(3,4-ethylenedioxythiophene)/polyethylene glycol (PEDOT/PEG) copolymer in a content of 15% by volume or more but 25% by volume or less.

2. A fuel cell separator comprising, on a substrate, an antimony-doped tin oxide film, wherein
the antimony-doped tin oxide film contains a poly(3,4-ethylenedioxythiophene)/polyethylene glycol (PEDOT/PEG) copolymer, and
an element ratio of a total of sulfur and carbon to tin [(S+C)/Sn] in the antimony-doped tin oxide film is 0.6 or more but 1.1 or less.

* * * * *